(12) United States Patent
Valve

(10) Patent No.: US 7,227,928 B2
(45) Date of Patent: Jun. 5, 2007

(54) ARRANGEMENT FOR LINE-TESTING

(75) Inventor: Ari Valve, Vantaa (FI)

(73) Assignee: Wi-LAN, Inc., Ottawa (CA)

( * ) Notice: Subject to any disclaimer, the term of this patent is extended or adjusted under 35 U.S.C. 154(b) by 429 days.

(21) Appl. No.: 10/476,154

(22) PCT Filed: Apr. 25, 2002

(86) PCT No.: PCT/FI02/00348

§ 371 (c)(1),
(2), (4) Date: Oct. 27, 2003

(87) PCT Pub. No.: WO02/089456

PCT Pub. Date: Nov. 7, 2002

(65) Prior Publication Data
US 2004/0156482 A1 Aug. 12, 2004

(30) Foreign Application Priority Data
Apr. 27, 2001 (FI) .................................. 20010896

(51) Int. Cl.
H04M 1/24 (2006.01)
H04M 3/08 (2006.01)
H04M 3/22 (2006.01)

(52) U.S. Cl. ................ 379/27.02; 379/1.01; 379/27.01; 379/27.06; 379/29.01

(58) Field of Classification Search ...... 379/1.01–1.04, 379/2, 9, 9.06, 12, 22.01, 22.04, 27.01, 27.06, 379/28, 29.01, 29.05, 27.02
See application file for complete search history.

(56) References Cited

U.S. PATENT DOCUMENTS 6,192,109 B1    2/2001  Amrany et al.
6,205,202 B1    3/2001  Yoshida et al.
6,215,855 B1    4/2001  Schneider
6,480,575 B2*  11/2002  Chea et al. .................... 379/9
6,535,581 B2*   3/2003  Singaliese ................ 379/29.01
6,553,105 B2*   4/2003  Chea et al. ............. 379/93.14
6,574,309 B1*   6/2003  Chea et al. .................... 379/9
6,594,343 B1*   7/2003  Duffie et al. ............... 379/1.01
2002/0122539 A1* 9/2002  Chea et al. ............. 379/27.01
2002/0131568 A1* 9/2002  Chea et al. ............. 379/93.14

FOREIGN PATENT DOCUMENTS

WO    WO 01/65816 A2    9/2001
WO    WO 02/09407 A2    1/2002

* cited by examiner

Primary Examiner—Binh K. Tieu
(74) Attorney, Agent, or Firm—Procopio, Cory, Hargreaves & Savitch

(57) ABSTRACT

This invention generally relates to the arrangements for testing subscriber loops. The invention is based on a solution wherein a test head is behind the high-pass filter of the splitter. In order that this solution is possible, the splitter, i.e. the splitter box has to contain a relay and a relay control element. When a subscriber line is to be tested the test head sends a DC pulse to the relay control element, which directs the relay to connect the subscriber loop to bypass wirings through which the test head can perform necessary testing measurements. When the testing is over the relay control element directs the relay to switch back for connecting the subscriber loop to the common port of the filters.

15 Claims, 5 Drawing Sheets

ARRANGEMENT FOR LINE-TESTING

FIELD OF THE INVENTION

This invention generally relates to the arrangements for testing subscriber loops, and more particularly to the arrangements, which comprise a splitter for separating low and high frequency traffic.

BACKGROUND OF THE INVENTION

FIG. 1 shows an example of a known subscriber line testing arrangement, wherein the subscriber line (1A) carries both normal POTS or ISDN traffic and xDSL (such as ADSL or VDSL) traffic. The arrangement according to FIG. 1 needs a splitter (3) for separating the POTS/ISDN traffic and the xDSL traffic. POTS (Plain Old Telephone Service) and ISDN (Integrated Services Digital Network) traffic are transmitted in a low frequency range while the xDSL (some Digital Subscriber Line system) traffic is transmitted in a higher frequency range. The splitter is normally a high-pass/low-pass filter, which comprises a common port (3A) for a subscriber loop, a low-pass port 3B) for a POTS/ISDN device (4), and a high-pass port (3C) for an xDSL device (5). The POTS/ISDN and XDSL devices have connections to a network.

In order for the line testing of the subscriber loop (1A) to be possible, a line tester (2) must be situated in front of the splitter before the subscriber loop from the subscriber (1) reaches the splitter, i.e. the subscriber loop is connected to the splitter through the line tester. This is due to the fact that it is impossible to measure all desired parameters through the splitter, i.e. through the high-pass or low-pass filter. It is worth noting that at subscriber's premise the loop is connected to a terminal, which also comprises a splitter.

FIG. 2 shows an example of how wiring is performed in a real implementation. Subscriber loops from subscribers (1) are connected to a MDF (Main Distribution Frame) (6), from where the subscriber loops are connected forward to the line tester (2). In the line tester the subscriber loop, which is to be tested, is connected to a test line (2D) (pair line) using a subscriber line dedicated relay (2C). A test head (2A), which is connected to the test line, performs line testing measurements. If the subscriber loop does not need to be tested the relay connects the subscriber loop back to the, MDF.

After the line tester the subscriber loop is connected from the MDF (6) to a subscriber loop dedicated splitter, more particularly into the common port (3A) of the splitter. In the splitter, the subscriber loop branches to two separate lines: a line of low frequency range and a line of high frequency range. Both lines, the line of low frequency range from the low-pass port (3B) and the line of high frequency range from the high-pass port (3C), are wired to the MDF from where they are connected to a POTS/ISDN device (4) and an xDSL device (5).

As can be noticed, the MDF connects all devices together. Thus the wiring can be multiple and when implementing it is easy to make mistakes. For helping the observing of FIG. 2 the wirings have been marked in different lines. Each device requires wiring space in the MDF, so the more devices concerning a dedicated subscriber loop are needed the less subscriber loops are possible to be connected to the MDF. It should be also noted that a line tester can handle several subscriber loops and in spite of what is illustrated in FIG. 2 the POTS/ISDN devices (4) can be one unit, which can handle several subscriber loops as well as xDSL devices (5).

The intention of the invention is to eliminate these drawbacks when making it possible to perform line testing through a splitter. Furthermore, since the splitter is a passive element it is desired to keep it passive in an arrangement according to the invention as well. The aims of the invention are achieved in a way described in the claims.

SUMMARY OF THE INVENTION

The invention is based on a solution wherein a test head is behind the high-pass filter of the splitter. In order that this solution is possible, the splitter, i.e. the splitter box has to contain a relay and a relay control element. The relay makes it possible to bypass the high-pass filter during the testing of the subscriber loop. When a subscriber line is to be tested the test head sends a DC pulse to the relay control element, which directs the relay to connect the subscriber loop to bypass wirings through which the test head can perform necessary testing measurements. When the testing is over the relay control element directs the relay to switch back for connecting the subscriber loop to the common port of the filters.

BRIEF DESCRIPTION OF THE DRAWINGS

In the following the invention is described in more detail by means of FIGS. 1–7 in the attached drawings where.

DETAILED DESCRIPTION OF THE PREFERRED EMBODIMENTS

Figure 1:
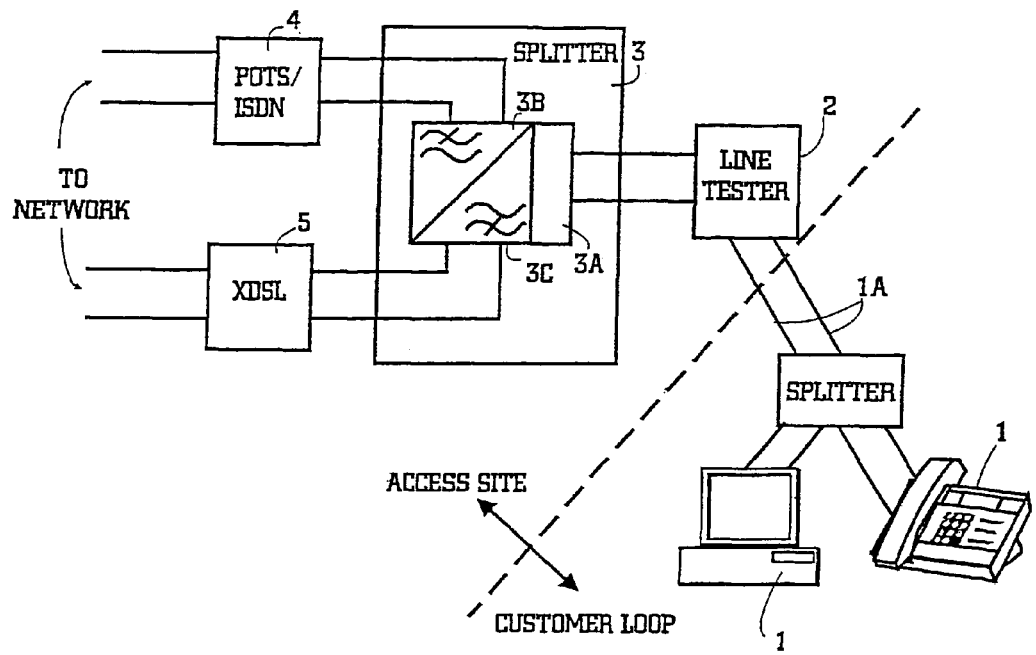
FIG. 1 illustrates an example of a present arrangement for testing a subscriber loop.
Figure 3:
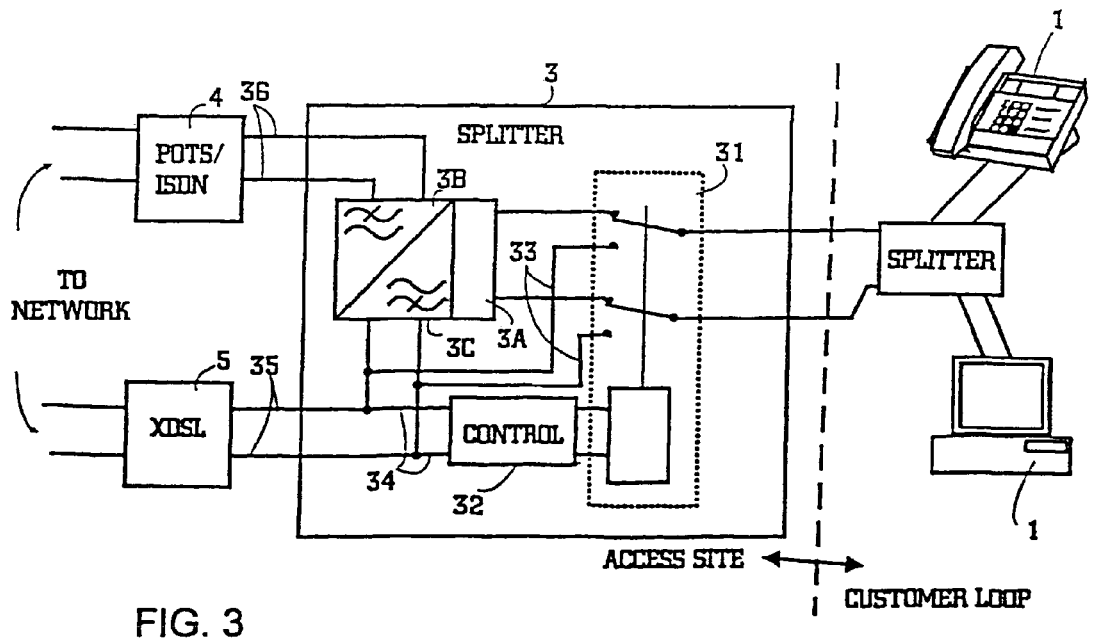
FIG. 3 illustrates an example of an arrangement according to the invention.
Figure 2:
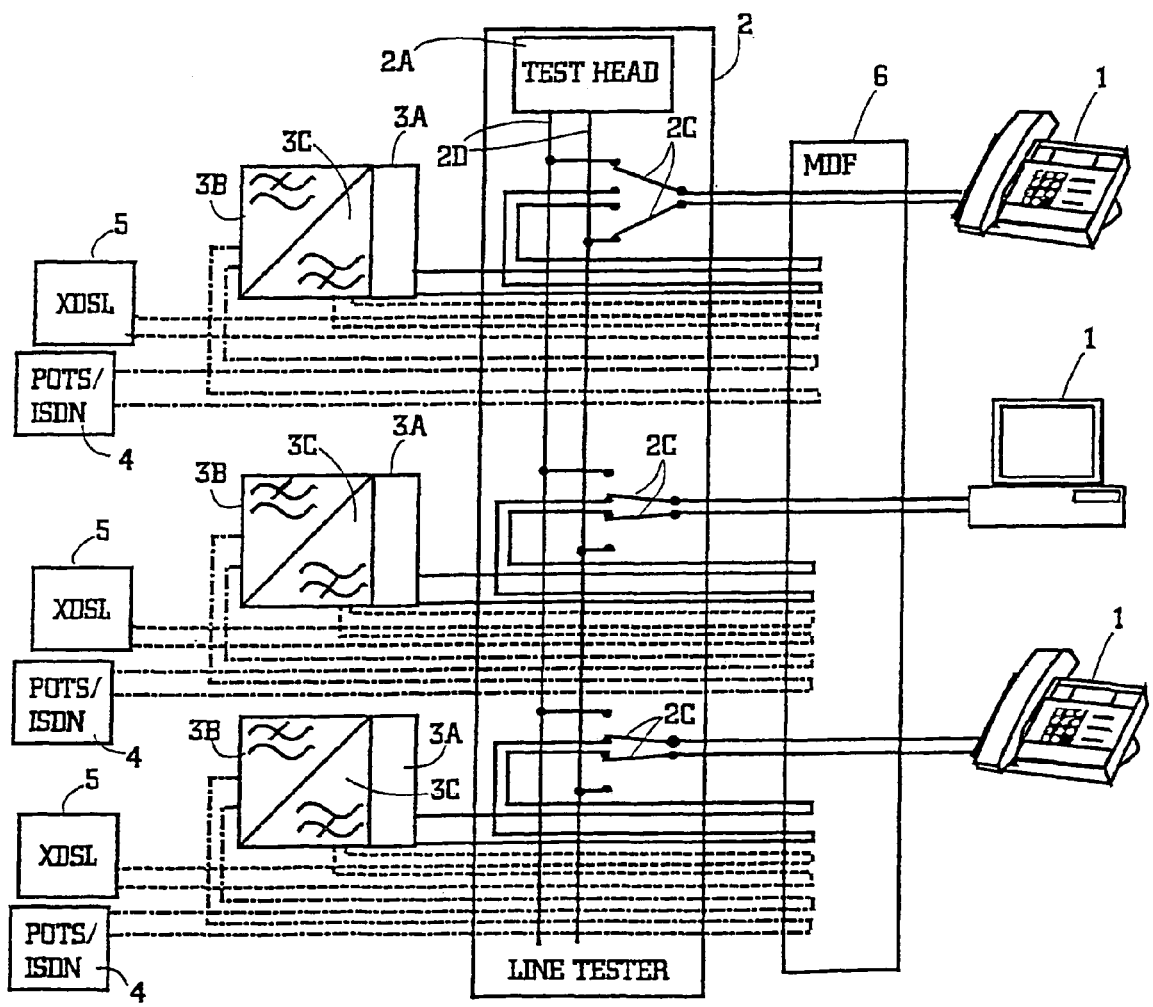
FIG. 2 illustrates an example of wirings in a present implementation.

FIG. 3 shows an example of an arrangement according to the invention. When the subscriber loop is to be tested a DC pulse is sent from a test head to the relay control element (32). in the splitter box (3). The test head can be situated in the XDSL device (5) or in another suitable place. However, the DC pulse is transmitted to the splitter box through the high-pass lines (35). The relay control element is connected to the high-pass line through control wires (34). Since the high-pass filter forms an open circuit for DC current the pulse does not propagate through the high-pass port (3C).

The relay control element (32) has a suitable integration time of the DC pulse before it can direct the relay (31) to switch for making a connection to the bypass wires (33). The other ends of the bypass wires are connected to the high-pass line (35). The bypass wires make it possible for the test head to perform the test measurements desired. The relay control element forms a high impedance towards the xDSL device so the relay control element does not disturb the line testing measurements. DC power is not fed into the high-pass line during the measurements when the relay (and the arrangement) is in a line testing state.

After the line testing measurements have been made and the arrangement (and the relay) is to be returned to the normal state, the relay control element directs the relay to switch back for breaking the bypass connection and for connecting the subscriber loop to the common port (3A) of the filters of the splitter. There are at least two possibilities to create a command for switching the relay back to the position of the normal state (connecting the subscriber loop to the common port of the filters of the splitter): 1) the relay control element has a function for time-out after which the relay control element directs the relay, or 2) the test head inserts an opposite polarity DC pulse to the relay control element, which as a response for this pulse directs the relay.

The relay control element and the relay are splitter dedicated, assigned to one subscriber. Since the relay and the relay control elements are passive it is possible to maintain the splitter box as simply as possible. However, it is worth noting that in some cases it can be useful if the relay control element (and maybe the relay as well) is an active element, i.e. it needs it's own power feeding system from outside.

Figure 4:
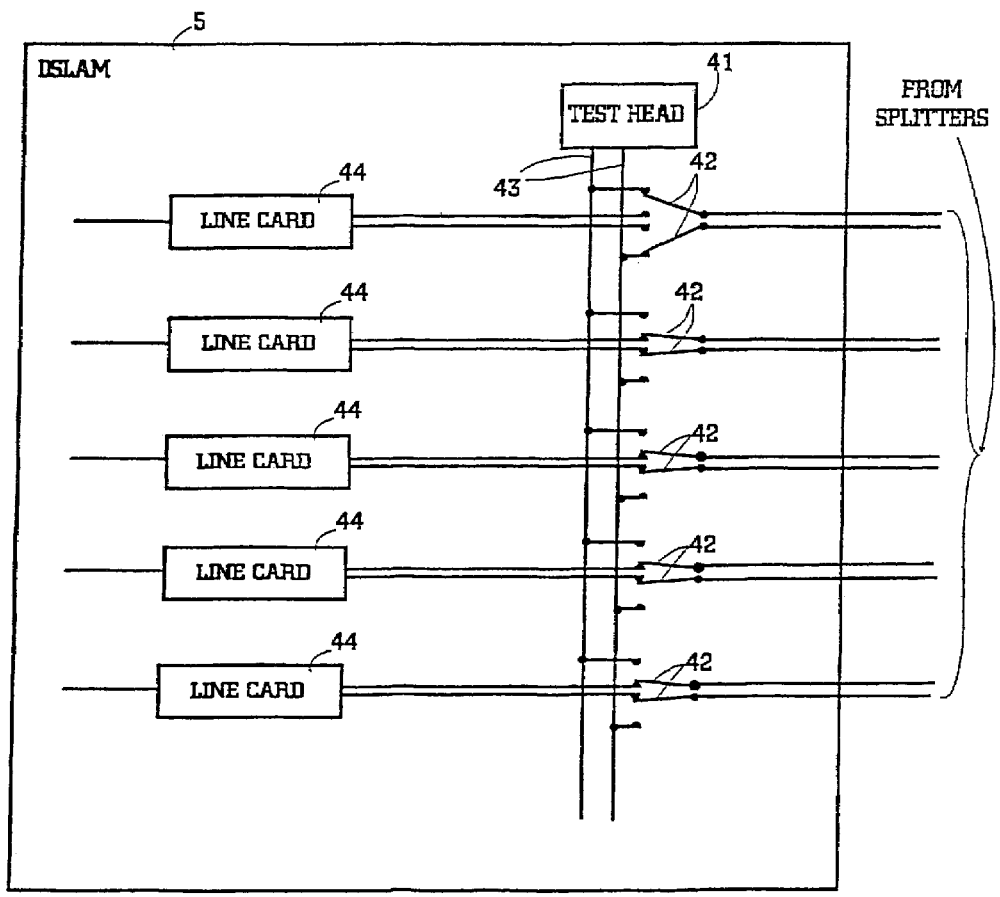
FIG. 4 illustrates an example of an xDSL device with line testing equipment.

FIG. 4 shows an example of an xDSL device (5) with line testing equipment The XDSL device can be, for example, a DSLAM (Digital Subscriber Line Access Multiplexer). The DSLAM contains a number of line cards (44). Before the high-pass lines from the splitters are wired to the line cards, the lines are connected to relays (42) through which it is possible to connect the high-pass lines (i.e. the subscriber lines) to the test line (43) which in turn is connected to the test head (41). The test head does not have to be in the DSLAM but it can be in any suitable place. However, it is required that a connection can be set up from the test head to the subscriber loop to be tested.

Figure 5:
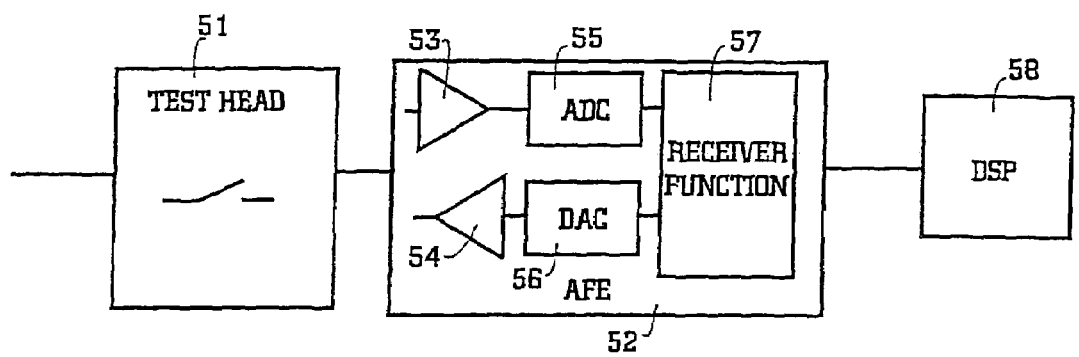
FIG. 5 illustrates an example of a line card wherein line testing equipment is combined.

It is also possible to combine a test head into the line card. FIG. 5 shows an example of this kind of arrangement The test head (51) is situated in front of an AFE (Analog Front End) (52) from the view of the high-pass line (the subscriber line). The test head block contains equipment for connecting the test head to the line to be measured. The AFE contains line drivers (53, 54) for the incoming traffic and the outgoing traffic, an ADC (Analog to Digital Converter) (55) for incoming traffic, a DAC (Digital to Analog Converter) (56) for outgoing traffic, and a receiver (57) for doing certain functions. A DSP (Digital Signal Processor) (58) controls the operation of the AFE and performs certain tasks for the transmission traffic. It can be possible that the DSP and the receiver are combined.

Figure 6:
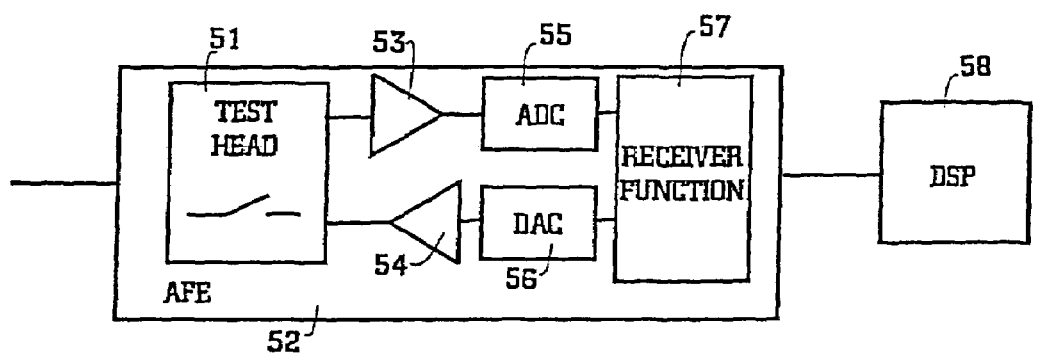
FIG. 6 illustrates another example of a line card wherein line testing equipment is combined.

FIG. 6 shows another example of how a test head is combined into a line card. In this case the AFE block contains the test head. The functionality of the line card according to FIG. 6 is the same as the functionality of the line card according to FIG. 5.

Figure 7:
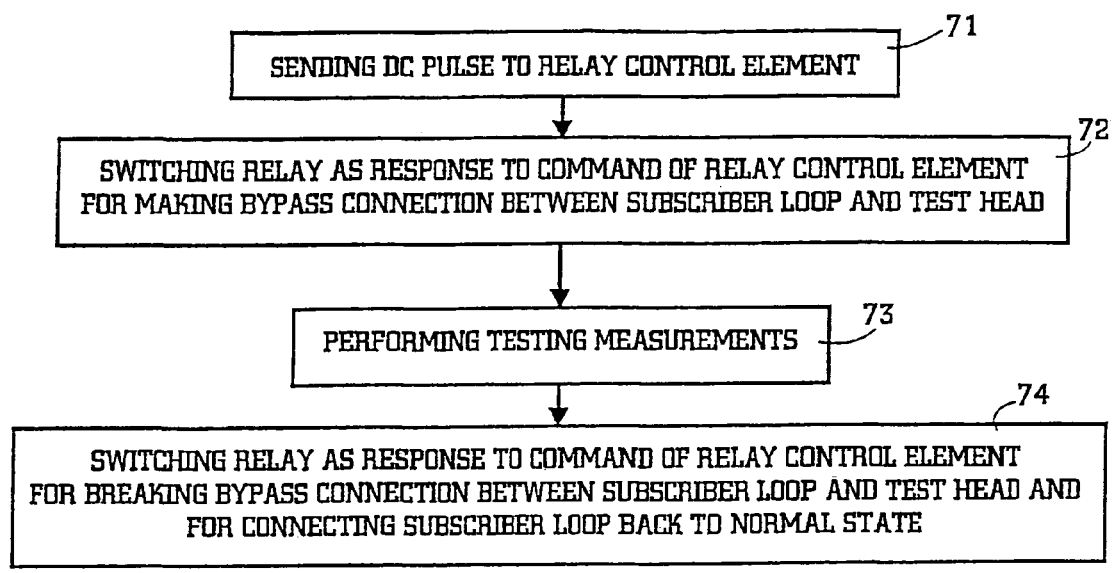
FIG. 7 illustrates a flow chart describing an embodiment of the method according to the invention.

FIG. 7 shows a flow chart describing an embodiment of the method according to the invention. When a subscriber line is to be tested a DC pulse is sent (71) to the relay control element in the splitter box through the line (high-pass line) connecting an xDSL device and the splitter box. As a response to the DC pulse the relay control element directs, i.e. commands, the relay to switch into another position for making (72) a bypass connection between the subscriber loop and the test head. The test head performs (73) the testing measurements through the bypass connection. After the measurements, the relay is commanded by the relay control element to switch (74) back to the normal state, i.e. to make connection between the filters of the splitter and the subscriber loop and to break the bypass connection.

So, the invention makes it possible to perform line testing measurements behind a splitter. Wiring in an access site, i.e. the place where the splitter is, is simple, and the splitter remains passive. The test head can be situated in any suitable location.

It is worth noting that the invention can be realized in other ways than those described above. For example, the test head can be situated behind the low-pass line (FIG. 3, 36) in which case the test head could be in the POTS/ISDN device (FIG. 3, 4). However, now, the pulse, which is needed to give a command for starting the line testing, can not be a DC pulse (notice that the relay control element is connected to the low-pass line in this case) since the DC pulse will propagate to the subscriber line through the low-pass filter. Due to this, the pulse should be a high-frequency signal. However, this solution is more difficult to perform and the relay control element should preferably be an active element, which is not desirable.

Taking all above-mentioned matters into account, it is evident that the invention can be implemented in many ways, in the scope of the inventive idea.

The invention claimed is:

1. An arrangement for testing a subscriber line comprising a splitter, characterized in that the arrangement comprises:
    a test head, situated beyond the splitter from the view of the subscriber line, connected to a filter port of the splitter and configured to generate a commands in the form of DC pulses,
    a relay, situated in front of a common port of filters of the splitter from the view of the subscriber line, and connected to the subscriber line and the common port of the filters of the splitter, for making a connection between the common port of the filters and the subscriber line in a normal state,
    bypass wires between the filter port of the splitter and the relay, making it possible for the relay to connect the test head to the subscriber line through the filter port of the splitter in a line testing state, and
    a relay control element connected to the filter port of the splitter and the relay for controlling switching actions of the relay in response to the commands in the form of DC pulses coming from the test head.

2. An arrangement according to claim 1, characterized in that the relay, bypass wires, and the relay control element are located in a box wherein the splitter has been implemented.

3. An arrangement according to claim 1, characterized in that the filter port of the splitter whereto the test head is connected is a high-pass port.

4. An arrangement according to claim 3, characterized in that the test head and elements needed to connect the test head to a line coming from the filter port of the splitter, are situated in an xDSL device.

5. An arrangement according to claim 4, characterized in that the test head is situated in front of a line card from the view of the line coming from the filter port.

6. An arrangement according to claim 3, characterized in that the command from the test head for connecting the arrangement to the normal state is DC pulse of opposite polarity to the DC pulse used for connecting the test head in the line testing state.

7. An arrangement according to claim 3, characterized in that the relay control element comprises means for creating a command for connecting the arrangement to the normal state.

8. An arrangement according to claim 4, characterized in that the test head is combined with a line card, which is dedicated to the subscriber line.

9. A method for testing a subscriber line, the method comprising the steps of:

sending a command in the form of a DC pulse from a test head to a relay control element, directing a relay to switch to a line testing state as a response to the command in the form of a DC pulse received by the relay control element, switching the relay for making a bypass connection that passes a splitter, performing testing measurements, and switching the relay for breaking the bypass connection that passes the splitter and for returning to a normal state.

10. A method according to claim 9, the method further comprising the step of sending a command from the test head to the relay control element directing a relay for switching to the normal state and for breaking the bypass connection.

11. An arrangement for testing a subscriber line comprising a splitter, characterized in that the arrangement comprises:

a test head, situated beyond the splitter from the view of the subscriber line, and connected to a low-pass filter port of the splitter, a relay, situated in front of a common port of low-pass filters of the splitter from the view of the subscriber line, and connected to the subscriber line and the common port of the low-pass filters of the splitter, for making a connection between the common port of the low-pass filters and the subscriber line in a normal state, bypass wires between the low-pass filter port of the splitter and the relay, making it possible for the relay to connect the test head to the subscriber line through the low-pass filter port of the splitter in a line testing state, a relay control element connected to the low-pass filter port of the splitter and the relay for controlling switching actions of the relay in response to commands coming from the test head, characterized in that the command from the test head for connecting the arrangement to the line testing state is a high-frequency signal.

12. An arrangement according to claim 11, characterized in that the test head and necessary elements, which are needed to connect the test head to a line coming from the filter port, are situated in an POTS/ISDN device.

13. An arrangement according to claim 12, characterized in that the test head is situated in front of a line card from the view of the line coming from the low-pass filter port.

14. An arrangement according to claim 11, characterized in that the relay control element comprises means for creating a command for connecting the arrangement to the normal state.

15. An arrangement according to claim 11, characterized in that the command from the test head for connecting the arrangement to the normal state is another high-frequency signal.

* * * * *